US012686020B2

(12) United States Patent
Podkolinkski

(10) Patent No.: US 12,686,020 B2
(45) Date of Patent: Jul. 21, 2026

(54) MOBILE FLUID EXPULSION DEVICE

(71) Applicant: FAURECIA SYSTEMES D'ECHAPPEMENT, Nanterre (FR)

(72) Inventor: Thomas Podkolinkski, Somerset (GB)

(73) Assignee: FAURECIA SYSTEMES D'ECHAPPEMENT, Nanterre (FR)

( * ) Notice: Subject to any disclaimer, the term of this patent is extended or adjusted under 35 U.S.C. 154(b) by 229 days.

(21) Appl. No.: 17/634,087

(22) PCT Filed: Aug. 13, 2020

(86) PCT No.: PCT/EP2020/072783

§ 371 (c)(1),
(2) Date: Feb. 9, 2022

(87) PCT Pub. No.: WO2021/028542

PCT Pub. Date: Feb. 18, 2021

(65) Prior Publication Data

US 2022/0347704 A1 Nov. 3, 2022

(30) Foreign Application Priority Data

Aug. 14, 2019 (GB) ..................................... 1911641

(51) Int. Cl.
*B05B 9/00* (2006.01)
*B05B 1/08* (2006.01)
(Continued)

(52) U.S. Cl.
CPC ................ *B05B 9/002* (2013.01); *B05B 1/08* (2013.01); *B05B 1/24* (2013.01); *B05B 9/005* (2013.01); *B05D 1/02* (2013.01); *B05B 7/1686* (2013.01)

(58) Field of Classification Search
CPC .. B05B 9/002; B05B 1/08; B05B 1/24; B05B 9/005; B05B 7/1686; B05D 1/02;
(Continued)

(56) References Cited

U.S. PATENT DOCUMENTS 3,731,876 A 5/1973 Showalter
6,213,104 B1 4/2001 Ishikiriyama et al.
(Continued)

FOREIGN PATENT DOCUMENTS

DE 20002198 U1 5/2000
EP 2343104 A1 7/2011
(Continued)

OTHER PUBLICATIONS

GB Combined Search and Examination Report for Application No. 1911641.7 dated Jan. 31, 2020.
(Continued)

*Primary Examiner* — Kevin Edward Schwartz
(74) *Attorney, Agent, or Firm* — Carlson, Gaskey & Olds, P.C.

(57) ABSTRACT

An apparatus and method are provided for expelling a fluid, including vapor and liquid sprays. A spray is expelled at high velocities from a heated chamber via an exit valve. The chamber includes a flow member or structure that directs and controls the flow of the fluid from an inlet orifice to an outlet orifice along a non-linear path. This prevents the liquid from moving in a wave motion within the chamber if the apparatus is moved.

28 Claims, 4 Drawing Sheets

(51) Int. Cl.

| | |
|---|---|
| ***B05B 1/24*** | (2006.01) |
| ***B05B 7/16*** | (2006.01) |
| ***B05D 1/02*** | (2006.01) |

(58) Field of Classification Search

CPC .......... F24H 1/162; F24H 1/121; F24H 15/37; B08B 2230/01

USPC .................. 239/13, 135, 130; 392/465, 484; 134/105

See application file for complete search history.

(56) References Cited

U.S. PATENT DOCUMENTS

| | | | | |
|---|---|---|---|---|
| 6,276,347 | B1 * | 8/2001 | Hunt | F02M 53/06 123/549 |
| 6,390,076 | B2 * | 5/2002 | Hunt | F02M 53/02 123/549 |
| 7,059,307 | B2 * | 6/2006 | Pellizzari | F02M 61/18 123/549 |
| 7,322,188 | B2 * | 1/2008 | Cline | F15B 21/048 60/407 |
| 7,946,300 | B2 * | 5/2011 | Kim | A47L 15/4291 134/105 |
| 8,100,191 | B2 * | 1/2012 | Beheshti | A62C 35/02 169/68 |
| 8,162,040 | B2 * | 4/2012 | Briselden | F23L 15/04 165/142 |
| 9,516,986 | B1 * | 12/2016 | Williams | F22B 1/28 |
| 2001/0020469 | A1 | 9/2001 | Hunt | |
| 2002/0181948 | A1 * | 12/2002 | Akahane | F24H 1/121 392/492 |
| 2003/0178009 | A1 * | 9/2003 | Pellizzari | F02M 65/008 123/549 |
| 2004/0226546 | A1 | 11/2004 | Pellizzari et al. | |
| 2009/0060481 | A1 * | 3/2009 | Kaastra | F24H 1/121 392/471 |
| 2009/0212125 | A1 * | 8/2009 | McIntosh | A61M 5/204 239/128 |
| 2010/0031957 | A1 * | 2/2010 | McIntosh | F23K 5/22 128/203.26 |
| 2010/0032176 | A1 * | 2/2010 | McIntosh | F23R 3/30 169/46 |
| 2010/0092163 | A1 * | 4/2010 | Yeung | F24H 15/156 392/441 |
| 2012/0160465 | A1 * | 6/2012 | Webb | F28F 1/40 165/181 |
| 2018/0031270 | A1 * | 2/2018 | Kim | F24H 9/1818 |
| 2020/0208874 | A1 * | 7/2020 | Emery | B05B 1/24 |

FOREIGN PATENT DOCUMENTS

| | | | |
|---|---|---|---|
| GB | 384667 | A | 12/1932 |
| GB | 2122511 | A | 1/1984 |

OTHER PUBLICATIONS

International Search Report for PCT/EP2020/072783 dated Oct. 28, 2020.

* cited by examiner

MOBILE FLUID EXPULSION DEVICE

CROSS-REFERENCE TO RELATED APPLICATIONS

This application is the US national phase of PCT/EP2020/072783, which was filed on Aug. 13, 2020, which claims priority to GB 1911641.7, filed Aug. 14, 2019.

TECHNICAL FIELD

The present disclosure is directed towards an apparatus and method for fluid expulsion. In particular, a device is provided for fluid expulsion which is able to expel fluid quickly and over relatively long distances from a chamber, even when the chamber is moved.

BACKGROUND

Devices exist which are capable of expelling fluids, including vapor and liquid sprays, at high velocities. These devices can be used, for example, in fire extinguishing systems, ink jet printers, engines, and medical devices.

Typically, they comprise a reservoir arranged to hold a liquid, an inlet valve arranged to transfer some of the liquid into a chamber and an exit or outlet valve arranged to control the expulsion of the material from the chamber. The chamber can be referred to as an ejection chamber. The speed of ejection and distance travelled (also referred to as the "throw") by the expelled material is influenced by a number of variables, including the fluid being expelled, the temperature and pressure in the chamber, the valve timing, the size of the chamber, the outlet valve orifice size, and the viscosity of the fluid to be ejected.

EP2343104B1 to the University of Leeds describes an apparatus for ejecting material with improved speed of ejection and distance travelled by the ejected liquid and liquid vapor. The material is heated within a chamber, past the saturation point of the liquid at ambient pressure. The inlet and exit valves are kept closed, during heating, such that the pressure within the chamber is increased. The liquid is then released via the exit valve, where the sudden drop in pressure causes rapid expansion of the liquid and a vapor explosion.

However, it was found that the known devices cannot reliably provide the same throw properties if the device was moved, or if the orientation was changed, whilst in use. It was found that changes in orientation, or even subtle movements such as rocking of the device, affect the propulsion and throw of the fluid from the outlet valve. The droplet size of the ejected mist was also be affected by movement of the chamber. The present disclosure sets out to address this issue.

SUMMARY

According to the present disclosure there is provided an apparatus for expelling a fluid comprising; a reservoir for storing the fluid, a chamber, an inlet orifice to the chamber, an inlet valve, an outlet orifice from the chamber, an outlet valve, at least one heater to heat the fluid within the chamber, such that a temperature and a pressure of the fluid are raised when the inlet valve and the outlet valve are closed, causing at least a portion of the fluid within the chamber to change state, a flow member or structure to direct and control the flow of fluid from the inlet orifice to the outlet orifice along a non-linear path, whereby in use, fluid is expelled from the outlet orifice of the chamber by a vapor explosion process.

The fluid entering the chamber can be a liquid, or a mixture of liquid and gas, such as a foam, but is preferably a liquid. Where the fluid is a liquid or foam, it could also include suspended entrained particulate solids. The fluid can be pumped towards the chamber, or it could be supplied under a pressure differential, or could be supplied using a gravity feed. The fluid could be a liquid such as water, or a hydrocarbon fuel (e.g. petrol, kerosene or gasoline), to provide some examples. The fluid could also be a solution comprising a solvent and solute.

The chamber comprises an outlet orifice which is provided at a separate, distinct location in the chamber from the inlet orifice. As the temperature and pressure rises within the chamber, the liquid within the chamber changes state to a gas. In the process, a foam is also formed. It has been found that it is preferable to have a foam present at the outlet orifice, as this reduces the droplet size of the resulting spray from the outlet orifice.

Preferably, the inlet and outlet valves each comprise an actuator and a seat. The actuator can control the opening and closing of the valve. The actuator may be a solenoid. The valve seat can provide a sealing surface, thus enabling closure of the valve and enabling pressurization of the chamber.

The fluid is supplied from the reservoir into the chamber, where it is heated and pressurized. The chamber will be formed from a material which is able to withstand substantial changes in temperature and differentials in pressure. It may have a generally cylindrical shape. The chamber may also be referred to as a pressure vessel. It may be formed from a metal such as steel, copper or aluminum, or a polymer. Alternatively, the chamber may be formed from a composite material wound around a metal liner, in the form of a composite overwrapped pressure vessel. The chamber may be lined with another metal, ceramic, or polymer. The size and shape of the chamber can vary according to the desired application.

The structure that directs and controls the flow of fluid from the inlet orifice to the outlet orifice is positioned within the chamber and is a device which directs the fluid to follow a non-linear path. The flow member or structure to direct and control the flow of fluid from the inlet orifice to the outlet orifice along a non-linear path can initiate and assist foam formation within the chamber and helps to ensure that there is foam within the chamber at the outlet orifice. Without the flow member or structure to direct and control the flow of fluid along a non-linear path, when the chamber is moved, or the orientation is changed, the liquid moves, and this can disrupt and/or destroy the foam which has accumulated in the vicinity of the outlet orifice. The liquid breaks the foam and separates the foam into its component parts of liquid and gas. It will be understood that the extent of destruction of the foam will depend on the amount of movement of the liquid within the chamber, as well as the speed of movement. In some applications, the chamber may be subjected to a tilting movement, whilst in other applications the chamber may be subjected to more substantial movement, including inversion. The accumulation of liquid in the vicinity of the outlet orifice which could substantially hinder the efficient expulsion of fluid from the outlet orifice.

The insertion of a flow member or structure to direct and control the flow of fluid along a non-linear path inside the chamber causes an obstruction within the chamber, thus preventing the liquid from travelling freely through the chamber when the orientation of the chamber or device is changed. Therefore, the obstruction slows the fluid such that there is less momentum or impact on the foam, and the foam is largely protected from destruction by the regardless of the movement of the chamber. The direction of the fluid along a non-linear path ensures that a pool of liquid does not accumulate over the outlet orifice, which therefore enables efficient and effective operation of the device.

It is desirable to have a high foam concentration in the vicinity of the outlet orifice of the chamber, as it has been found that when foam rather than liquid is expelled from the outlet orifice, the droplet size of the resulting spray is smaller. There is further break-up of the foam as the fluid is expelled through the outlet orifice by way of a vapor explosion.

The flow member or structure to direct and control the flow of fluid from the inlet orifice to the outlet orifice along a non-linear path assists with ensuring that foam is present at the outlet orifice, no matter the orientation of the device. The aim of directing the fluid along a non-linear path is to ensure that there is good conversion of the liquid in the chamber to a foam and to ensure that there is a foam at the vicinity of the outlet orifice. Therefore, even if the device is moved or the orientation is changed, the properties of the spray which is expelled from the outlet orifice is largely unaffected. This improves the reproducibility of the spray properties achieved with a given set of conditions, which in turn also improves the reliability of the apparatus in any given application.

Preferably, 100% of the fluid is directed along a non-linear path from the inlet orifice to the outlet orifice.

Before heating, the outlet and inlet valves are closed to prevent the escape of fluid. Heating the fluid in the chamber causes an increase in the pressure within the chamber and hence also a lowering of the boiling temperature of the fluid. In most cases, where the fluid is a foam, the saturation or boiling point of the fluid will be based upon the boiling temperature of the liquid phase. The liquid is heated to a temperature well above the boiling point/temperature at atmospheric pressure, which causes the liquid to change state. Preferably, the liquid in the chamber is heated to a temperature equal to or above the saturation point of the liquid at atmospheric pressure, or equal to or above the saturation point of the fluid at a pressure which is the pressure downstream of the outlet valve of the chamber. The temperature can be monitored by one or more temperature sensors.

A heater is used to heat the fluid and can be arranged to raise the temperature of the fluid to a value equal to or greater than a saturation temperature of the fluid at ambient pressure. The heater may be a heating element located in or near the chamber, for heating the fluid. The heater may be a heated jacket which surrounds or partially surrounds the chamber, for example.

Alternatively, the heater may be generated by chemical components. For example, two chemicals may be combined which undergo an exothermic reaction when mixed, where the heat generated is sufficient to heat the fluid to a temperature which exceeds the saturation temperature of the fluid.

The sudden release of pressure when the fluid exits the outlet orifice causes a vapor explosion due to the rapid expansion of liquid, foam and/or vapor. The vapor explosion has the effect that the material is blasted out from the chamber very rapidly and over further distances than would otherwise be obtainable. A mixture of vapor and fine spray is ejected from the outlet orifice, which can travel at high velocities and over considerable distances.

For example, the throw of a liquid and vapor explosion in accordance with embodiments of the present disclosure may be around 200 to 300 times or more of the corresponding chamber length. This is due to the high fluid pressures which are obtained the chamber, as well as the dynamics of the fluid within the chamber.

A further feature of the device is that it can continually emit bursts of vapor in very quick succession. The valve timing can be programmed such that the outlet valve opens every few milli-seconds.

The temperature at which the outlet valve is allowed to open can be referred to as the trigger temperature. The trigger temperature can be set above the boiling point of the liquid or liquids within the chamber to ensure maximum explosion of liquid from the chamber. The trigger temperature can be set in the range of 10° C. to 200° C. above the boiling point of the liquid. Preferably, the trigger temperature is set in the range of 20° C. to 90° C. above the boiling point of the liquid. The necessary trigger temperature is relative to the ambient pressure of the environment into which the expelled spray is being injected into, i.e. the ambient environment external to the chamber at the outlet orifice. If the ambient pressure is high, then it is necessary to increase the temperature and pressure within the chamber, and the trigger temperature value will be at the higher end of the scale. The ratio of liquid to vapor can be altered when higher trigger temperatures are selected. This can eliminate the liquid phase altogether, if desired. In this way, the proportion of liquid and vapor can be controlled by varying one or more parameters associated with the chamber. It has been found that if the trigger temperature is not at least 10° C. higher than the boiling temperature of the liquid, then the droplet size is large.

Alternatively, instead of monitoring the temperature, the pressure within the chamber could be monitored and the outlet valve could be opened when a predetermined pressure value is reached. Selectively varying one or more parameters such as temperature, pressure or viscosity of the liquid can be used to selectively control the drop size achieved in the resulting spray.

The outlet orifice aperture can vary in size depending on the desired spray properties. The outlet orifice from the chamber may be connected to a nozzle (not shown) to alter the dispersion properties of the spray. The nozzle can be used to generate a spray which has a wider field of dispersion, or a narrower, more concentrated spray. A nozzle can also be used to further decrease the droplet size of the liquid in the spray, such that a finer spray is produced.

The non-linear path along which the fluid is directed can cause a minimum of 90° of change to the direction in which the fluid is travelling. The degrees of change required will be dependent upon the application or end use of the apparatus. The non-linear path could cause a minimum of 180°, 270°, or 360° of change in the direction in which the fluid was travelling.

Depending upon the application, it may be necessary to increase the degrees of change to protect the foam layer within the chamber from the movement of the fluid. For applications where the apparatus may be exposed to greater degrees of movement, it would be preferable to direct the fluid along a more complex or more tortuous path, such that there is a minimum of 180° of change.

The aim of the non-linear path is to prevent liquid from rapidly moving in a wave motion within the chamber. The greater disruption to the flow of liquid, the less kinetic energy the liquid has when it contacts the foam, which in turn results in the preservation of a greater portion of the foam. For example, if the chamber is exposed to a rocking motion along a single axis, it would be sufficient for the non-linear path to direct the fluid through a minimum of 90° of change. As an example, a baffle or barrier within the chamber could alter the direction of travel of the fluid by 90° in order to circumvent the baffle. In practice, if the chamber is exposed only to a rocking motion, the baffle can be arranged such that liquid is retained on one side of the barrier, where only foam or gas will travel easily over the baffle. This depends on the relative height and arrangement of the baffle. The baffle would need to cause a change in direction of the fluid of at least 90° in order to achieve the desired effect. By arranging the baffle in such a way, it is possible to prevent the liquid on the first side of the baffle from destroying or breaking-up the foam which may be present on the second side of the baffle, despite the movement of the chamber.

For applications where the chamber is exposed to greater degrees of motion, possibly along more than one axis, it will be necessary to have greater degrees of change in the direction of the non-linear path in order to prevent destruction of the foam. For some applications, a minimum of 180° of change will be required, and for others, a minimum of 360° of change is required.

The flow member or structure to direct and control the flow of fluid from the inlet orifice to the outlet orifice along a non-linear path can comprise at least one non-linear channel and may comprise a plurality of non-linear channels. In general, a single channel is preferable if the fluid is viscous.

The flow member or structure to direct and control the flow of fluid from the inlet orifice to the outlet orifice may comprise at least one channel having a series of bends which cause the fluid to change direction several times. The fluid may be directed along a tortuous path comprising many bends at different angles.

The flow member or structure to direct and control the flow of the fluid from the inlet orifice to the outlet orifice may comprise at least one helical or spiral channel. Due to the channel, the fluid may be directed along an oscillating or twisting path.

The flow member or structure to direct and control the flow of fluid from the inlet orifice to the outlet orifice along a non-linear path could comprise at least one baffle, arranged to cause the fluid to change direction. Optionally, it could comprise a series of baffles arranged to cause the fluid to change direction several times. The baffles would be arranged within the chamber to prevent the fluid from following a linear path between the inlet orifice and the outlet orifice.

At least heater may be external to the chamber. The heater may be a heated jacket which surrounds or partially surrounds the chamber, for example. This could be used alone or in conjunction with another heater, such as a heater located within the chamber.

At least one heater may be internal to the chamber, where the flow member or structure to direct and control the flow of fluid from the inlet orifice to the outlet orifice along a non linear path can be positioned proximal to the at least one heater.

Optionally, at least one heater can be internal to the chamber, where the flow member or structure to direct and control the flow of fluid from the inlet orifice to the outlet orifice along a non-linear path can be external to the heater. In other words, the flow member or structure to direct and control the fluid along a non-linear path may be positioned around the heating element. For example, a helical channel can be formed around a central cylindrical heating element.

As another option, at least one heater can be internal to the chamber and the flow member or structure to direct and control the flow of fluid from the inlet orifice to the outlet orifice along a non-linear path can be positioned within the heater, where the flow of fluid is in fluid isolation from the heater. For example, a heating coil may be configured such that it is adjacent to the inner walls of the chamber, and this heating coil may be filled with a shaped element which ensures that the flow of fluid is directed along a non-linear path from the inlet orifice to the outlet orifice, where the flow of fluid is in fluid isolation from the heater.

The heating element may itself form part of the structure for creating a non-linear pathway for the fluid to travel from the inlet valve to the outlet valve. In this configuration, at least one heater is arranged such that it is also the flow member or structure to direct and control the flow of fluid from the inlet orifice to the outlet orifice along a non-linear path. As an example, there may be a heating element which is formed in a shape which forces the fluid to change direction within the chamber.

Two or more heaters may be used. For example, an internal heating element may be used in combination with an external heating jacket. The chamber may be located in a hot environment, and able to absorb heat from the surroundings. For example, if the device is used in a combustion chamber of an engine, the heat required to bring the fuel to the designated temperature can be partially or totally obtained from the heat produced by the engine. When in use, the engine will be very hot, and the chamber can be designed to absorb the required heat from the environment. The heat or thermal energy can be obtained through the chamber walls of the injector, through a heat exchanger going into the chamber, or a combination of the two techniques. Additionally, the inlet pipe can be arranged such that it goes through or passes adjacent to the hot parts of the engine body, such that the fluid entering the inlet valve is heated nearer to the designated temperature before entering the chamber. However, it is preferable to maintain the temperature of the fluid below the saturation temperature of the lightest component of the fuel to avoid unfavorable cavitation in the pipelines.

The apparatus may further comprise a pump for supplying fluid to the chamber from the reservoir.

The inlet and outlet valves may be arranged separately from the inlet and outlet orifices. This allows the location of the valve to be different from that of the inlet and outlet orifices, which is desirable for certain applications, for example, when the material leaving via the outlet valve is at such a high temperature that it would damage the valve.

The apparatus can comprise at least one controller connected to the inlet and outlet valves, such that the opening and closing of the inlet valve and outlet valve is electronically controlled. The controller can be programmed such that it closes the outlet valve when the closure pressure or when a set temperature is reached and such that it opens the inlet valve again to introduce new fluid into the chamber. The system can cycle between introducing new fluid into the chamber and expelling the fluid from the outlet orifice (e.g. 1:1 valve timing of inlet and outlet valve opening). Alternatively, the valve timing may be offset, such that the chamber is filled with fluid, and the outlet valve then fires a series of short rapid burst until the chamber is emptied. The controller can be programmed to open the valves according to a timing sequence, where the valves are opened and closed for a predetermined time, provided that a predetermined (or set) pressure or temperature within the chamber has been reached or exceeded. The predetermined temperature could correspond with the saturation temperature of the fluid within the chamber at atmospheric pressure.

The temperature can be monitored by one or more temperature sensors which may be fitted inside the chamber or near to the chamber, for example in the inlet stream, or on a wall of the chamber. The apparatus can also comprise at least one pressure sensor inside the chamber. This may be a pressure transducer.

As fluid is expelled from the chamber, the pressure within the chamber drops. The outlet valve can be arranged to close when the pressure has dropped back to an ambient or second predetermined pressure, which may be referred to as the closure pressure. Alternatively, the outlet valve may be arranged to close after a preselected amount of time has passed.

It is possible to include a recycle loop (not illustrated) from the chamber to the reservoir. The recycle loop would be designed to allow some of the fluid in the chamber to return to the reservoir when the inlet valve is open for replenishing the fluid in the chamber. The recycle line allows some fluid to pass from the chamber back to the reservoir. Fresh fluid is supplied to the chamber from the reservoir via the inlet valve. The recycled fluid will be warmer than the fluid in the reservoir; such that the recycled fluid helps to raise the temperature of the fluid in the reservoir. This can accelerate the heating of the fluid in the chamber.

The claimed apparatus for rapidly expelling a fluid can be used in fire extinguishing systems, inkjet printers, fuel injection systems for engines, gas igniters, and medical devices such as nebulizers, to name just a few examples.

Also provided is a method for expulsion of a fluid from a chamber, comprising: supplying fluid from a reservoir to the chamber via an inlet orifice by opening an inlet valve to the chamber; directing the fluid inside the chamber to flow via a non-linear path to an outlet orifice via an outlet valve; whilst the fluid is inside the chamber and the inlet and outlet valves are closed, heating the fluid to a temperature which is equal to or greater than the saturation point of the fluid at atmospheric pressure, such that at least a portion of the fluid changes state; opening the outlet valve such that fluid is expelled from the outlet orifice by a vapor explosion process.

The description provided above relating to the apparatus applies equally to the method for expulsion. In the chamber, as the fluid is moved from the inlet orifice towards the outlet orifice, the flow member or structure to direct and control the flow of fluid from the inlet orifice to the outlet orifice along a non-linear path assists with maintaining any foam which has been formed in the chamber and prevents destruction of the foam by liquid movement. The flow member or structure for directing the fluid along a non-linear path helps to ensure that a high concentration of foam is present in the vicinity of the outlet orifice, no matter the orientation of the device. Therefore, even if the device is moved or the orientation is changed, the properties of the spray which is expelled from the outlet orifice is largely unaffected. This improves the reliability of the device, and the reproducibility of the spray properties achieved with a given set of conditions, even if the orientation of the device is changed.

The flow member or structure to direct and control the flow of fluid along a non-linear path may cause a minimum of 90° of change to the direction in which the fluid was travelling.

The preselected value of the temperature of the fluid in the chamber can be equal to or greater than a saturation temperature of the fluid at atmospheric or ambient pressure. The fluid can be heated by a heater arranged in or near the chamber.

A large concentration of foam at the vicinity of the outlet orifice improves the spray produced from the outlet orifice and increases the reliability of the device.

Optionally, the fluid can be expelled through a nozzle connected to the outlet orifice. A nozzle can be used to alter and control the properties of the spray.

The fluid can be directed from the inlet orifice to the outlet orifice via at least one non-linear channel, or alternatively, via a plurality of non-linear channels. The fluid can be directed from the inlet orifice to the outlet orifice via at least one channel having a series of bends which cause the fluid to change direction several times. This can be via at least one helical or spiral channel.

The fluid can be directed from the inlet orifice to the outlet orifice of the non-linear channel which can be positioned proximal to a heating element.

Preferably, the fluid can be supplied to the chamber from the reservoir by a pump. The temperature in the chamber can be monitored by at least one sensor. At least one sensor can be used to measure the pressure in the chamber.

Optionally, a fraction of the fluid from the chamber can be returned to the reservoir via a recycle loop.

The opening and closing of the inlet valve and outlet valve can be electronically controlled by a controller. This may be performed based on the pressure in the chamber, where the pressure is measured by one or more pressure sensors.

BRIEF DESCRIPTION OF THE DRAWINGS

The disclosure will now be described by way of example, with reference to the accompanying drawings.

Figure 1:
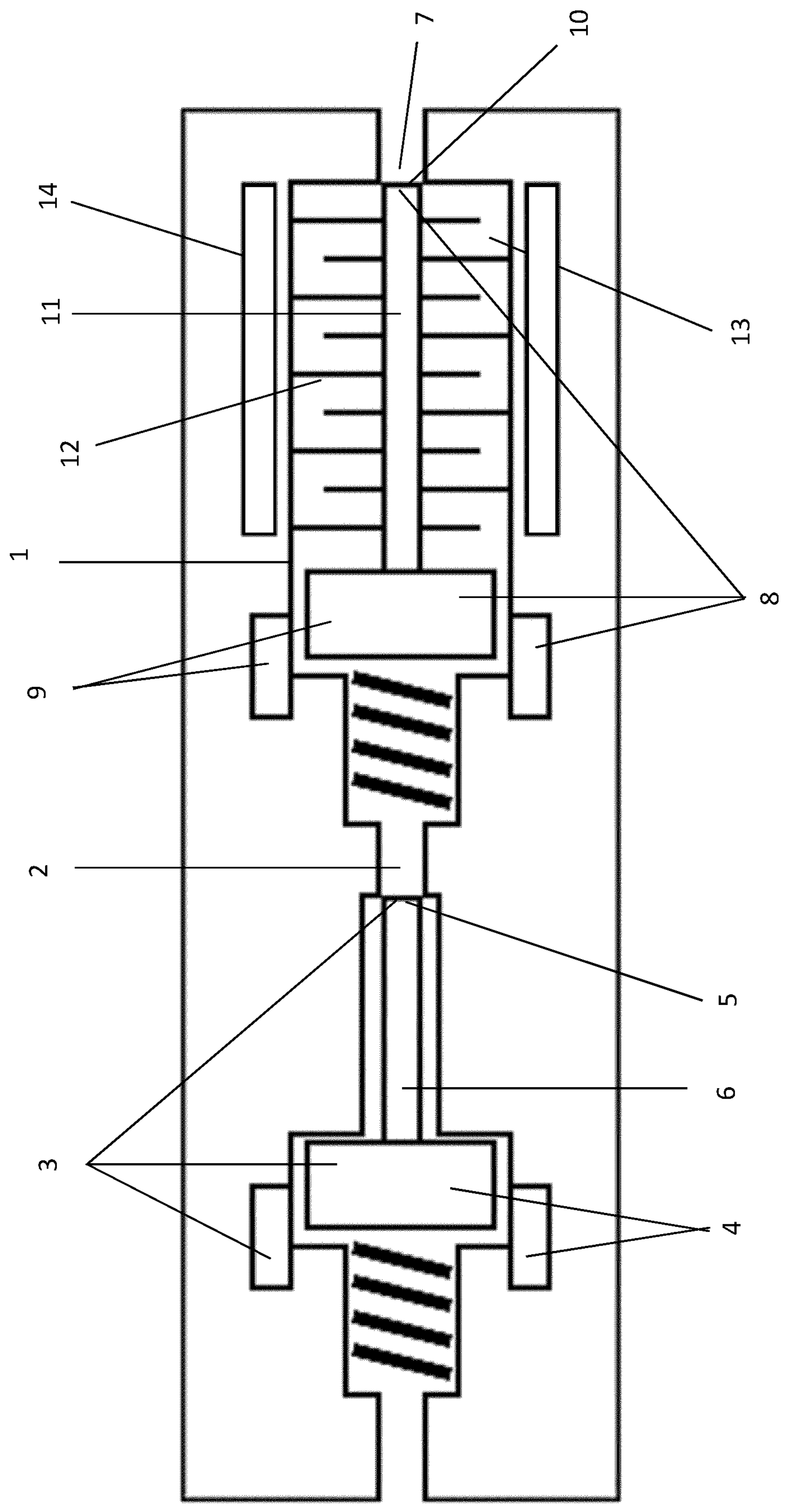
FIG. 1 is a cross-sectional view of an example of a fluid expulsion device according to the present disclosure.

A cross-sectional view of an example of a fluid expulsion device is provided in FIG. 1. The fluid flows in the direction of the arrow, towards the chamber 1 via inlet orifice 2, when the inlet valve 3 is opened by the inlet valve actuator 4.

Figure 2:
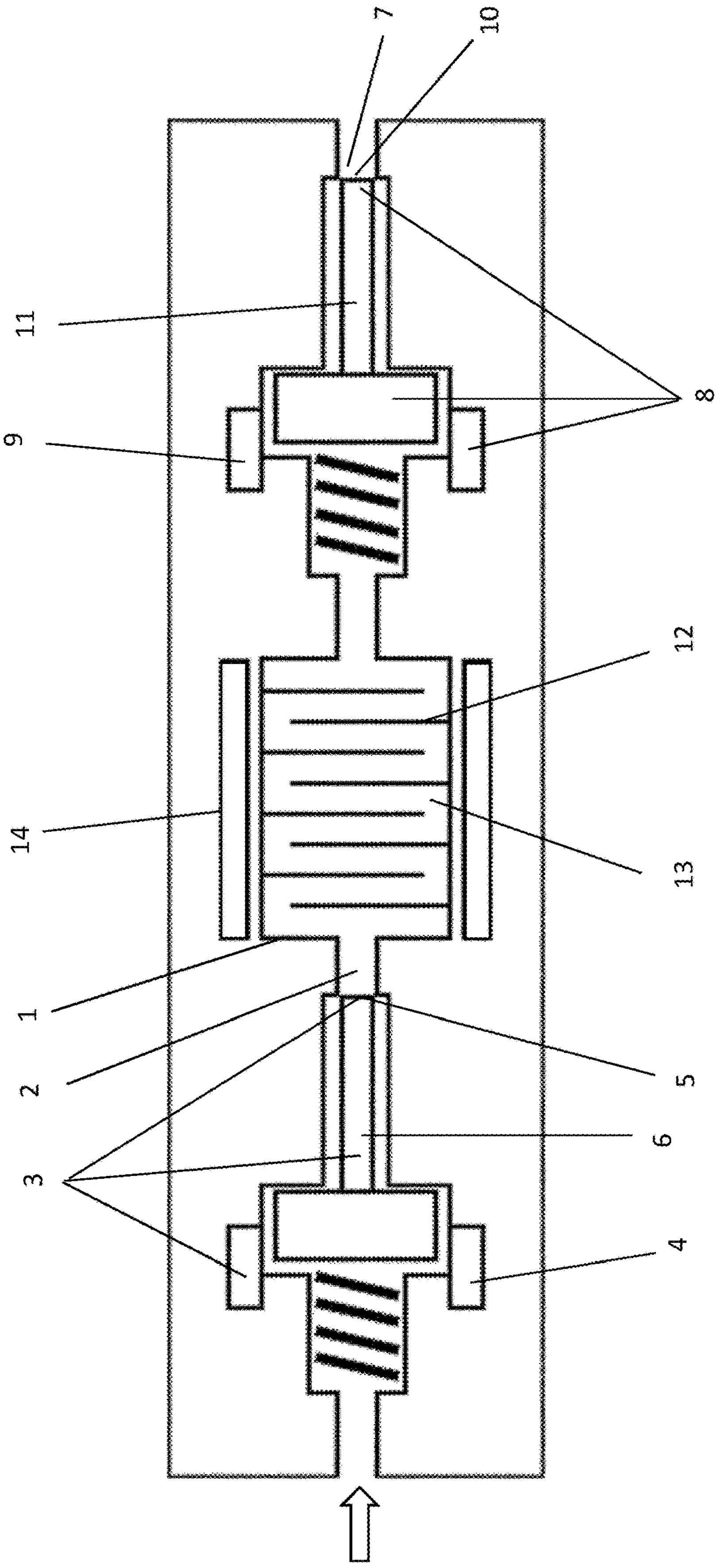
FIG. 2 is a cross-sectional view of another example of a fluid expulsion device according to the present disclosure.

A cross-sectional view of an example of a fluid expulsion device is provided in FIG. 2. The fluid flows in the direction of the arrow, towards the chamber 1 via inlet orifice 2, when the inlet valve 3 is opened by the inlet valve actuator 4.

Figure 3:
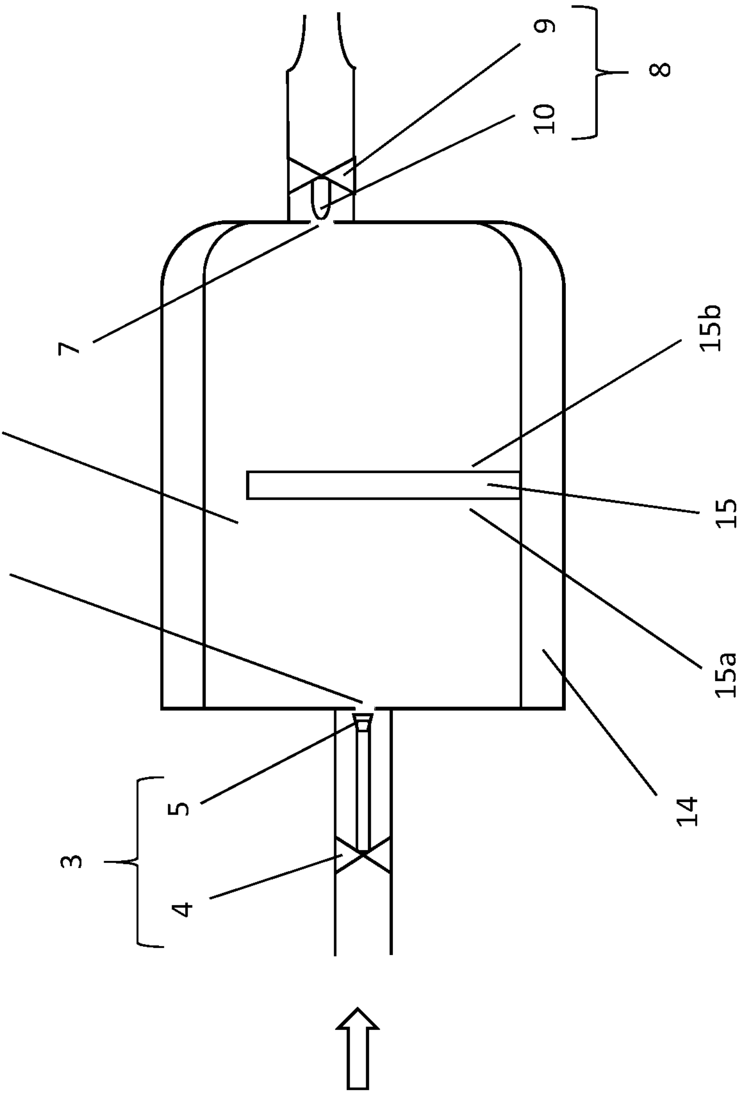
FIG. 3 is a cross-sectional view of another example of a fluid expulsion device according to the present disclosure.

A cross-sectional view of an example of a fluid expulsion device is provided in FIG. 3. The fluid flows in the direction of the arrow, towards the chamber 1, via inlet orifice 2, when the inlet valve is open.

DETAILED DESCRIPTION

An embodiment of a fluid expulsion device according to this disclosure is illustrated in FIG. 1. A fluid is supplied from a reservoir (not illustrated) into a chamber 1 via an inlet orifice 2. The fluid which is supplied through the inlet is preferably a liquid. The liquid or foam could also include suspended entrained particulate solids. The liquid could be a solution comprising a solvent and a solute. Preferably, the fluid is pumped from the reservoir to the chamber 1.

The inlet orifice 2 and inlet valve 3 are arranged to allow a portion of fluid into the chamber 1 via an associated inlet pipe, tube, or channel from the reservoir. The fluid passes through the inlet orifice 2 when the inlet valve 3 is in the open position. The inlet valve 3 of FIG. 1 comprises a valve actuator 4 and a valve seat 5. The valve actuator 4 may be connected to a controller (not illustrated). In the embodiment illustrated in FIG. 1, the inlet actuator 4 is spaced from the inlet orifice 2 due to the use of a pintle or rod 6 connecting the valve actuator 4 to the valve seat 5. The inlet valve 3 is opened to allow fluid to enter the chamber 1 until the chamber 1 contains a predetermined quantity of fluid. When the predetermined quantity of fluid has entered the chamber, the inlet valve 3 is closed by the inlet valve actuator 4.

A separate outlet orifice 7 is provided at another location in the chamber 1. The outlet orifice 7 is opened or closed using outlet valve 8. Opening the valve 8 allows fluid to be ejected from the chamber 1, whilst closing the valve 8 allows fluid to be sealed in the chamber 1. The outlet valve 8 comprises an outlet valve actuator 9 and a valve seat 10. In the embodiment illustrated in FIG. 1, the outlet valve actuator 9 is spaced from the outlet orifice 7 due to the use of a pintle 11 which connects the outlet valve actuator 9 to the valve seat 10.

The chamber 1 further includes a flow member or structure 12 to direct and control the flow of fluid from the inlet orifice to the outlet orifice along a non-linear path 13. The flow member or structure 12 to direct and control the flow of fluid is a component arranged to redirect the flow of the fluid within the chamber 1, such that the fluid is forced to change direction several times when travelling between the inlet orifice 2 and the outlet orifice 7.

In FIG. 1, the flow member or structure 12 is an element having a helical shape which forces the fluid towards the outer periphery of the chamber 1. The fluid may travel inwards towards the center of the chamber 1 in the gaps between the helically shaped protrusions from the element; and may travel outwards towards the periphery of the chamber 1. This may create a flow path which oscillates in respect of the direction of travel. Alternatively, a series of baffles could be used in place of the helical element. The fluid is unable to travel in a linear fashion from the inlet orifice 2 to the outlet orifice 7 due to the obstruction at the inlet orifice 2 and outlet orifice 7 caused by the element. The flow member or structure 12 acts to increase the foam concentration in the vicinity of the outlet orifice 7, by preventing the break-up or destruction of foam by the liquid in the chamber.

Figure 4:
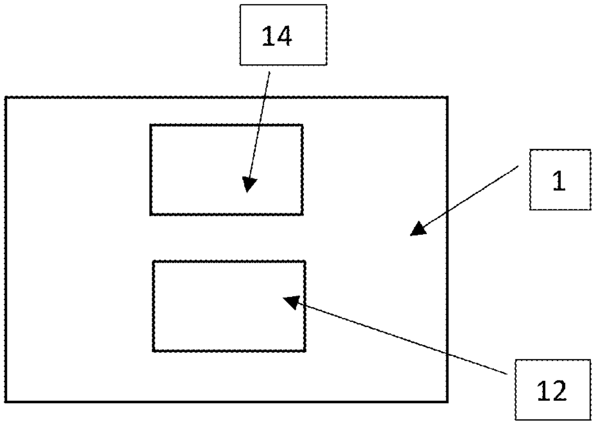
FIG. 4 is a schematic view of another example of a heater configuration for a fluid expulsion device according to the present disclosure.
Figure 5:
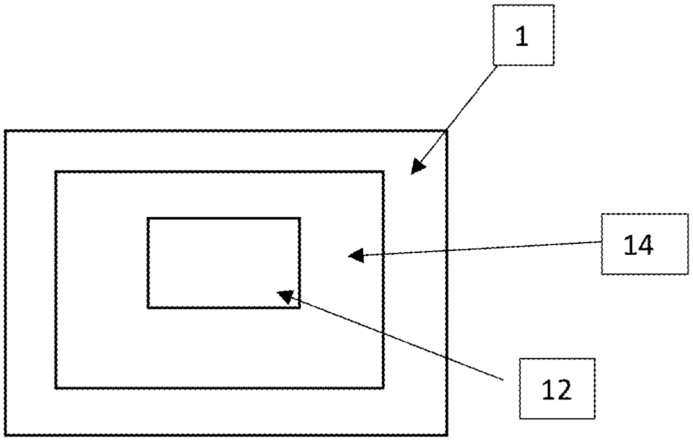
FIG. 5 is a schematic view of another example of a heater configuration for a fluid expulsion device according to the present disclosure.

The fluid is heated inside the chamber 1 using a heater 14, with the inlet 3 and outlet valves 8 being closed. The heater 14 can be located within the chamber 1 (FIGS. 4-5) or can be external to the chamber (FIGS. 1-3). In the embodiment demonstrated in FIG. 1, the heater 14 is an external heating jacket, but as explained above, alternative heaters can also be used.

Closing the inlet 3 and outlet 8 valves prevents the escape of fluid. Heating the fluid in the chamber causes an increase in the pressure within the chamber 1 and hence also a further temperature increase. The temperature can be monitored by one or more temperature sensors (not shown) which may be fitted inside the chamber 1 or near to the chamber 1, for example in the inlet stream, or on a wall of the chamber 1.

The pressure can be monitored by one or more pressure sensors (not shown), such as pressure transducers, which may be located in the chamber 1. The outlet valve 8 may be arranged to open after a specified amount of time. The outlet valve 8 can be controlled by a controller (not shown) such that the outlet valve 8 will not open when the pressure is below a specific predetermined pressure. Alternatively, the outlet valve 8 can be controlled such that the outlet valve 8 will not open when the temperature is below a specific predetermined temperature.

The sudden release of pressure when the fluid exits the outlet orifice 7 causes a vapor explosion due to the rapid expansion of liquid, foam and/or vapor. The outlet orifice 7 may be optionally connected to a nozzle (not shown) which can be used to alter the dispersion properties of the spray and to further decrease the droplet size of the liquid in the spray.

The device is able to produce vapor or mist in short sharp bursts; the volume of vapor released corresponds to the amount of fluid which is fed into the chamber 1. As fluid is expelled from the chamber 1, the pressure within the chamber 1 drops. The outlet valve 8 can be arranged to close when the pressure has dropped back to an ambient or second predetermined pressure, which may be referred to as the closure pressure. Alternatively, the outlet valve 8 can be arranged to close once the temperature has returned to a predetermined temperature. The outlet valve 8 may be arranged to close after a specific amount of time has passed.

A controller can be programmed such that it closes the outlet valve 8 when a predetermined closure pressure is reached and opens the inlet valve 3 again to introduce new fluid into the chamber 1. The system can cycle between introducing new fluid into the chamber 1 and expelling the fluid from the outlet orifice 7. The controller can be used in combination with the valve actuators 4,9 to control a rapid cycle of expelling the fluid and admitting new fluid into the chamber 1. Alternatively, the controller can be programmed to open the valves according to a timing sequence, where the valves 3,8 are opened and closed for a predetermined time, provided that a set (predetermined) pressure or temperature has been reached or exceeded. The valve timing can be offset, such that the inlet valve can be open for longer, followed by several rapid openings of the outlet valve. The timing sequence chosen for the valve will depend on the specific application for the device.

A further embodiment of the disclosure is illustrated in FIG. 2. This embodiment is similar to the embodiment illustrated in FIG. 1, except that the valves are not spaced from the inlet and outlet orifices. The numbering and description provided above for FIG. 1 applies to FIG. 2, with the only difference being that the outlet valve actuator 9 is located downstream from the chamber 1, and proximal to the outlet orifice 7.

In FIG. 3, an embodiment of the disclosure is illustrated, where the chamber 1 is exposed to movement along a single axis and a baffle 15 is used to induce a 180° change in the direction of flow of the fluid from a first side of the baffle 15*a* to the second side of the baffle 15*b*. If the chamber is cylindrical, the baffle may be concentric.

In the embodiment of FIG. 3, the inlet and outlet (2,7) orifices are offset. The fluid flows through the inlet valve 3 and into chamber 1. The inlet valve 3 comprises a valve actuator 4 and a valve seat 5. In the embodiment illustrated in FIG. 3, the inlet valve actuator 4 is spaced from the valve seat 5 by a pintle 6. Once inside the chamber 1, the fluid has to go through 180° of change in order to pass over baffle 15. Any foam which is formed on the second side of baffle 15*b* is protected from the movement of liquid on the first side of the baffle 15*a*, even if the chamber 1 is exposed to movement. This maximizes the probability that foam will be present at the outlet orifice 7. The fluid within the chamber 1 is pressurized and heated past the saturation temperature of the fluid at atmospheric or ambient pressure. The fluid is then rapidly expelled by a vapor explosion process through the outlet orifice 7 when the outlet valve 8 is opened. The outlet valve 8 comprises an outlet valve actuator 9 and an outlet valve seat 10.

Experimental Results

In this test, the influence of adding a spiral insert into the chamber was tested. The influence on the performance of the system across varying orientations was measured. In this experiment, the spiral insert directs and controls the flow of fluid along a non-linear path from the inlet orifice to the outlet orifice.

Running the system at a constant power setting (600 W) and flow rate (1 g/s), we ran the system whilst varying the orientation of the chamber (and outlet orifice) such that the angle of the spray was varied 30 degrees at a time. Water was used as the operating fluid in all the experiments. The same pressure (3.8 bar) and temperature (150° C.) of the chamber was used for all of the experiments. All conditions other than the insertion of the spiral, and the angle of the spray were kept constant.

Starting in a horizontal position the system was operated such that water was sprayed for 5 minutes from which an average droplet size was measured. The system was then rotated 30 degrees in a clockwise direction, such that the orientation of the chamber was changed, and the resulting spray direction was now pointing downwards. Again, the system was operated such that water was sprayed for 5 minutes from which an average droplet size was measured. The system was then rotated a further 30 degrees in a clockwise direction so that the spray direction was now pointing in a 60 degrees downward orientation. Water was sprayed for 5 minutes from the outlet orifice and an average droplet size was ascertained from the data collected. The same measurements were repeated at 300 intervals of rotation until the system was back in the original orientation.

The same set of measurements were taken for the system with and without the spiral insert in the chamber. The table below shows a comparison of the results obtained from each system. It also illustrates the difference in spraying quality which is obtained by using the inserted spiral when spraying across multiple orientations.

| Orientation | System Without Insert: Avg. Droplet Diameter (μm) | System With Insert: Avg. Droplet Diameter (μm) |
|---|---|---|
| Horizontal | 23.4 | 23.8 |
| 30° Down | 24.1 | 24.0 |
| 60° Down | 178.0 | 24.0 |
| 90° Down | 246.8 | 24.4 |
| 60° Down Upside-down | 181.2 | 23.9 |
| 30° Down Upside-down | 24.0 | 24.3 |
| Horizontal Upside-down | 23.7 | 23.9 |
| 30° Up Upside-down | 23.6 | 23.6 |
| 60° Up Upside-down | Spraying is irregular | 23.9 |
| 90° Up | Spraying practically stops | 23.8 |
| 60° Up | Spraying is irregular | 23.7 |
| 30° Up | 24.2 | 23.8 |

The results show a far more consistent spray performance from the system according to the present disclosure with the insert present in the chamber, when compared to the same system without an insert.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A pressurized mobile fluid expulsion apparatus for expelling a fluid comprising:
- a reservoir for storing the fluid;
- a pressure vessel extending from an inlet end to an outlet end;
- an inlet orifice at the inlet end;
- an inlet valve at the inlet end;
- an outlet orifice at the outlet end;
- an outlet valve at the outlet end;
- at least one controller connected to the inlet valve and the outlet valve;
- at least one heater to heat the fluid within the pressure vessel, such that a temperature and a pressure of the fluid are raised when the inlet valve and the outlet valve are closed, causing at least a portion of the fluid within the pressure vessel to change states into a foam;
- a foam protection member positioned within the pressure vessel to direct and control a flow of fluid from the inlet orifice to the outlet orifice along a non-linear path, wherein the foam protection member comprises one or more protrusions that force the fluid towards an outer periphery of the pressure vessel, and wherein the fluid travels inwards towards a center of the pressure vessel in gaps adjacent the one or more protrusions;
- where the foam protection member is a helical element, a spiral element, or a series of baffles, and
- whereby in use, fluid is expelled from the outlet orifice by a vapor explosion process.

2. The pressurized mobile fluid expulsion apparatus according to claim 1, where the inlet valve and the outlet valve each comprise a valve actuator and a valve seat.

3. The pressurized mobile fluid expulsion apparatus according to claim 1, where the at least one heater is arranged to raise the temperature of the fluid to a value equal to or greater than a saturation temperature of the fluid at ambient pressure.

4. The pressurized mobile fluid expulsion apparatus according to claim 1, wherein the at least one heater comprises a heating element arranged in or near the pressure vessel to heat the fluid in the pressure vessel.

5. The pressurized mobile fluid expulsion apparatus according to claim 1, where the foam protection member that directs and controls the flow of fluid from the inlet orifice to the outlet orifice along the non-linear path causes a minimum of 90° of change to a direction in which the fluid was travelling.

6. The pressurized mobile fluid expulsion apparatus according to claim 1, where the foam protection member that directs and controls the flow of fluid from the inlet orifice to the outlet orifice along the non-linear path causes a minimum of 270° of change to a direction in which the fluid was travelling.

7. The pressurized mobile fluid expulsion apparatus according to claim 1, where the foam protection member that directs and controls the flow of fluid from the inlet orifice to the outlet orifice along the non-linear path comprises at least one non-linear channel.

8. The pressurized mobile fluid expulsion apparatus according to claim 1, where the foam protection member that directs and controls the flow of fluid from the inlet orifice to the outlet orifice along the non-linear path comprises a plurality of non-linear channels.

9. The pressurized mobile fluid expulsion apparatus according to claim 1, where the foam protection member that directs and controls the flow of fluid from the inlet orifice to the outlet orifice along the non-linear path comprises at least one channel having a series of bends which cause the fluid to change direction several times.

10. The pressurized mobile fluid expulsion apparatus according to claim 1, where the foam protection member that directs and controls the flow of fluid from the inlet orifice to the outlet orifice along the non-linear path comprises at least one baffle arranged to cause the fluid to change direction.

11. The pressurized mobile fluid expulsion apparatus according to claim 1, where the foam protection member that directs and controls the flow of fluid from the inlet orifice to the outlet orifice along the non-linear path comprises a series of baffles arranged to cause the fluid to change direction several times.

12. The pressurized mobile fluid expulsion apparatus according to claim 1, where the foam protection member that directs and controls the flow of fluid from the inlet orifice to the outlet orifice comprises at least one helical or spiral channel.

13. The pressurized mobile fluid expulsion apparatus according to claim 1, where the at least one heater is external to the pressure vessel.

14. The pressurized mobile fluid expulsion apparatus according to claim 1, where the at least one heater is internal to the pressure vessel, and the foam protection member that directs and controls the flow of fluid from the inlet orifice to the outlet orifice along the non-linear path is positioned proximal to the at least one heater.

15. The pressurized mobile fluid expulsion apparatus according to claim 1, where the at least one heater is internal to the pressure vessel, and the foam protection member that directs and controls the flow of fluid from the inlet orifice to the outlet orifice along the non-linear path is external to the at least one heater.

16. The pressurized mobile fluid expulsion apparatus according to claim 1, where the at least one heater is internal to the pressure vessel and the foam protection member that directs and controls the flow of fluid from the inlet orifice to the outlet orifice along the non-linear path is positioned within the at least one heater, where the flow of fluid is in fluid isolation from the at least one heater.

17. The pressurized mobile fluid expulsion apparatus according to claim 1, where the at least one heater includes the foam protection member that directs and controls the flow of fluid from the inlet orifice to the outlet orifice along the non-linear path.

18. The pressurized mobile fluid expulsion apparatus according to claim 1, wherein the one or more protrusions form a plurality of channels.

19. The pressurized mobile fluid expulsion apparatus according to claim 1, including an outer housing that surrounds the pressure vessel.

20. The pressurized mobile fluid expulsion apparatus according to claim 19, wherein the outer housing surrounds the inlet valve and the outlet valve.

21. The pressurized mobile fluid expulsion apparatus according to claim 20, wherein the outer housing surrounds the at least one heater.

22. The pressurized mobile fluid expulsion apparatus according to claim 1, wherein the inlet valve includes an inlet valve seat that closes the inlet orifice and wherein the outlet valve includes an outlet valve seat that closes the outlet orifice, and wherein the one or more protrusions comprises a liquid blocking barrier that increases foam concentration in a vicinity of the outlet orifice.

23. The pressurized mobile fluid expulsion apparatus according to claim 1, wherein the inlet end and the outlet end are at opposite ends of the pressure vessel.

24. The pressurized mobile fluid expulsion apparatus according to claim 23, wherein the inlet orifice and the outlet orifice are coaxial.

25. The pressurized mobile fluid expulsion apparatus according to claim 1, wherein the one or more protrusions comprises a plurality of discrete protrusions that are spaced apart and separate from each other.

26. The pressurized mobile fluid expulsion apparatus according to claim 1, wherein the inlet valve comprises an inlet valve actuator and an inlet valve seat, and wherein the inlet valve actuator is spaced from the inlet orifice by a pintle or rod connecting the inlet valve actuator to the inlet valve seat.

27. The pressurized mobile fluid expulsion apparatus according to claim 26, wherein the outlet valve comprises an outlet valve actuator and an outlet valve seat, and wherein the outlet valve actuator is spaced from the outlet orifice by a pintle or rod connecting the outlet valve actuator to the outlet valve seat.

28. The pressurized mobile fluid expulsion apparatus according to claim 1, wherein the one or more protrusions comprise liquid blocking barriers that reduce liquid flow around the liquid blocking barriers and increases foam flow around the liquid blocking barriers to increase foam concentration in a vicinity of the outlet orifice.

* * * * *